(12) United States Patent
Tiesler et al.

(10) Patent No.: US 7,140,996 B2
(45) Date of Patent: Nov. 28, 2006

(54) MULTIPLE GEAR STAGE AUTOMATIC TRANSMISSION

(75) Inventors: Peter Tiesler, Meckenbeuren (DE); Gerhard Gumpoltsberger, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 37 days.

(21) Appl. No.: 10/930,602

(22) Filed: Aug. 31, 2004

(65) Prior Publication Data

US 2005/0085333 A1 Apr. 21, 2005

(30) Foreign Application Priority Data

Sep. 4, 2003 (DE) ................. 103 40 728

(51) Int. Cl.
*F16H 3/62* (2006.01)
(52) U.S. Cl. ............... 475/276; 475/275; 475/279; 475/281; 475/291
(58) Field of Classification Search ........... 475/275, 475/276, 279, 281, 291
See application file for complete search history.

(56) References Cited

U.S. PATENT DOCUMENTS

| | | | |
|---|---|---|---|
| 3,776,066 A | 12/1973 | Piret | |
| 3,977,272 A | 8/1976 | Neumann | |
| 4,070,927 A | 1/1978 | Polak | |
| 4,395,925 A | 8/1983 | Gaus | |
| 4,732,253 A | 3/1988 | Hiramatsu et al. | |
| 4,939,955 A | 7/1990 | Sugano | |
| 5,106,352 A | 4/1992 | Lepelletier | |
| 5,232,411 A | 8/1993 | Hayashi et al. | |
| 5,250,011 A | 10/1993 | Pierce | |
| 5,295,924 A | 3/1994 | Beim | |
| 5,308,295 A | 5/1994 | Michioka et al. | |
| 5,435,792 A | 7/1995 | Justice et al. | |
| 5,439,088 A | 8/1995 | Michioka et al. | |
| 5,460,579 A | 10/1995 | Kappel et al. | |
| 5,520,588 A | 5/1996 | Hall, III | |
| 5,533,945 A | 7/1996 | Martin et al. | |
| 5,536,220 A | 7/1996 | Martin | |
| 5,542,889 A | 8/1996 | Pierce et al. | |
| 5,647,816 A | 7/1997 | Michioka et al. | |
| 5,735,376 A | 4/1998 | Moroto et al. | |
| 6,139,463 A | 10/2000 | Kasuya et al. | |
| 6,471,616 B1 | 10/2002 | Stevenson | |
| 6,558,287 B1 | 5/2003 | Hayabuchi et al. | |
| 6,572,507 B1 | 6/2003 | Korkmaz et al. | |
| 6,634,980 B1 | 10/2003 | Ziemer | |
| 6,723,018 B1 | 4/2004 | Hayabuchi et al. | |
| 2002/0091032 A1 | 7/2002 | Hayabuchi et al. | |

(Continued)

FOREIGN PATENT DOCUMENTS

DE 26 19 895 11/1976

(Continued)

*Primary Examiner*—Rodney H. Bonck
*Assistant Examiner*—David D. Le
(74) *Attorney, Agent, or Firm*—Davis & Bujold, P.L.L.C.

(57) ABSTRACT

A multiple gear transmission having a drive shaft (1) and a driven shaft (2), three planetary gear sets (P1, P2, P3), seven rotatable shafts (1, 2, 3, 4, 5, 6, 7) and seven shifting elements (03, 04, 05, 06, 14, 37, 57) comprising four brakes (03, 04, 05, 06,) and three clutches (14, 37, 57). Selective engagement of the seven shifting elements (03, 04, 05, 06, 14, 37, 57) produces from the drive supplied by the drive shaft (1), via the three planetary gear sets (P1, P2, P3), the seven rotatable shafts (1, 2, 3, 4, 5, 6, 7) and the driven shaft (2), different reduction ratios for nine forward gears and one reverse gear.

27 Claims, 4 Drawing Sheets

U.S. PATENT DOCUMENTS

| | | |
|---|---|---|
| 2002/0183160 A1 | 12/2002 | Kao et al. |
| 2003/0060322 A1 | 3/2003 | Raghavan et al. |
| 2003/0083174 A1 | 5/2003 | Tabata et al. |
| 2003/0119623 A1 | 6/2003 | Stevenson et al. |
| 2003/0162625 A1 | 8/2003 | Raghavan et al. |
| 2004/0092357 A1 | 5/2004 | Biermann |
| 2004/0097324 A1 | 5/2004 | Ziemer |
| 2004/0116238 A1 | 6/2004 | Ziemer |
| 2005/0215379 A1* | 9/2005 | Usoro et al. ............... 475/275 |
| 2005/0272554 A1* | 12/2005 | Raghavan et al. .......... 475/286 |
| 2006/0019793 A1* | 1/2006 | Bucknor et al. ............ 475/275 |

FOREIGN PATENT DOCUMENTS

| | | |
|---|---|---|
| DE | 27 21 719 | 12/1977 |
| DE | 29 36 969 A1 | 4/1981 |
| DE | 38 25 733 A1 | 2/1989 |
| DE | 42 24 360 A1 | 1/1993 |
| DE | 42 24 361 A1 | 1/1993 |
| DE | 43 02 518 A1 | 8/1993 |
| DE | 43 32 466 A1 | 3/1995 |
| DE | 195 24 698 A1 | 2/1996 |
| DE | 197 02 198 A1 | 7/1998 |
| DE | 198 33 376 A1 | 12/1999 |
| DE | 199 12 480 A1 | 9/2000 |
| DE | 199 12 481 A1 | 9/2000 |
| DE | 199 49 507 A1 | 4/2001 |
| DE | 102 00 379 A1 | 8/2002 |
| DE | 101 15 983 A1 | 10/2002 |
| DE | 101 15 986 A1 | 10/2002 |
| DE | 101 15 987 A1 | 10/2002 |
| DE | 102 13 820 A1 | 10/2002 |
| DE | 101 46 606 A1 | 4/2003 |
| DE | 102 50 374 A1 | 6/2003 |
| DE | 101 62 877 A1 | 7/2003 |
| DE | 101 62 883 A1 | 7/2003 |
| DE | 101 62 888 A1 | 7/2003 |
| EP | 0 434 525 A1 | 6/1991 |
| EP | 0 605 953 A1 | 7/1994 |
| EP | 0 719 961 A2 | 7/1996 |
| EP | 1 265 006 A2 | 12/2002 |
| JP | 4290649 | 10/1992 |
| JP | 8200456 | 8/1996 |
| JP | 10259861 | 9/1998 |
| JP | 2000240741 | 9/2000 |
| JP | 2001082555 | 3/2001 |
| JP | 2002323098 | 11/2002 |
| WO | WO-96/01381 | 1/1996 |

* cited by examiner

Variation 1:

| Grading | 1.46 | 1.55 | 1.34 | 1.2 | 1.3 | 1.24 | 1.11 | 1.16 | Spread 7.5 |
|---|---|---|---|---|---|---|---|---|---|
| i-Gear | 4.7 | 3.22 | 2.08 | 1.56 | 1.3 | 1 | 0.81 | 0.73 | -2.66 |
| SEtGg | 1 | 2 | 3 | 4 | 5 | 6 | 7 | 8 | 9 R |
| 03 |  |  |  |  |  |  |  |  |  |
| 04 | X |  |  |  |  |  |  |  |  |
| 05 |  | X |  |  |  |  |  |  | X |
| 06 | X | X |  | X |  |  | X | X |  |
| 14 |  |  | X | X | X | X | X |  |  |
| 37 |  |  | X |  | X | X |  | X | X |
| 57-IAK | X | X | X | X | X | X |  | X | X |

Fig. 3

Variation 2:

| Grading | 1.73 | 1.34 | 1.25 | 1.25 | 1.26 | 1.21 | 1.13 | 1.2 | Spread 7.5 |
|---|---|---|---|---|---|---|---|---|---|
| i-Gear | 4.55 | 2.64 | 1.98 | 1.58 | 1.26 | 1 | 0.83 | 0.73 | 0.61 -6.27 |
| SEtGg | 1 | 2 | 3 | 4 | 5 | 6 | 7 | 8 | 9 R |
| 03 |  |  |  |  |  |  |  | X |  |
| 04 | X |  |  |  |  |  |  |  |  |
| 05-IAK |  | X |  |  |  |  | X |  | X |
| 06 | X |  |  |  |  | X |  | X |  |
| 14 |  |  |  | X | X | X | X |  |  |
| 37 |  |  |  | X | X | X |  | X |  |
| 57 |  | X | X |  |  |  |  |  | X |

Fig. 4

MULTIPLE GEAR STAGE AUTOMATIC TRANSMISSION

This application claims priority from German Application Serial No. 103 40 728.6 filed Sep. 4, 2003.

FIELD OF THE INVENTION

The invention relates to a multiple gear transmission in planetary design, especially for an automatic transmission of a motor vehicle.

BACKGROUND OF THE INVENTION

According to the prior art, especially for motor vehicles, automatic transmissions comprise planetary gear sets shifted by means of frictional and shifting elements like clutches and brakes and are usually connected with a starting element such as a hydrodynamic torque converter or a fluid clutch liable to a slip effect and optionally provided with a lock-up clutch.

Such a transmission results from EP 0 434 525 A1. Essentially, it comprises one drive shaft and one driven shaft disposed in parallel, one double planetary gear set located concentrically to the drive shaft and five shifting elements in the form of three clutches and two brakes, the optional locking of which by pairs determines different gear ratios between the drive shaft and the driven shaft. This transmission has one front-mounted gear set and two power paths so that by selective engagement by pairs of the five shifting elements six forward gears are obtained.

In the first power path, two clutches are needed here to transmit the torque from the front-mounted gear set to two elements of the double planetary gear set. These are situated in power flow direction essentially behind the front-mounted gear set toward the double planetary gear set. In the second power path, one other clutch is provided which detachably connects them with another element of the double planetary gear set. The clutches are here disposed so that the inner disc carrier forms the output.

From the publication U.S. Pat. No. 6,139,463 a compact multiple gear transmission in planetary design is further known, especially for a motor vehicle, which has two planetary gear sets and one front-mounted gear set, the same as three clutches and two brakes. In this known multiple gear transmission, two clutches C-1 and C-3 are provided in a first power path for transmitting the torque from the front-mounted gear set to the two planetary gear sets. The outer disc carrier, the cylinder or piston and the pressure-compensation sides of the clutch C-3 are here respectively connected with one first brake B-1. Besides, the inner disc carrier of the third clutch C-3 is connected with the cylinder or piston and pressure-compensation sides of the first clutch C-1, the inner disc carrier of the first clutch C-1 being located on the output side and connected with a sun gear of the third planetary gear set.

From the Applicant's DE 199 49 507 A1 is also known a multiple gear transmission where two non-shiftable front-mounted gear sets on the drive shaft are provided which produce two rotational speeds on the output side which, together with the rotational speeds of the drive shaft, can optionally be shifted to the shiftable double planetary gear set acting upon the driven shaft by selective closing of the shifting elements used in a manner, such that to change from one gear to the respective next following higher or lower gear, only one of the two precisely actuated shifting elements has to be engaged or disengaged.

From DE 199 12 480 A1 one automatically shiftable motor vehicle transmission is also known, having three one-spider planetary gear sets, the same as three brakes and two clutches, for shifting six forward gears and one reverse gear and having one drive shaft, the same as one driven shaft. The automatically shiftable motor vehicle transmission is designed so that the drive shaft is directly connected with the sun gear of the second planetary gear set and that the drive shaft can be connected via the first clutch with the sun gear of the first planetary gear set and/or via the second clutch with the spider of the first planetary gear set. Additionally or alternatively, the sun gear of the first planetary gear set can be connected via the first brake with the housing of the transmission and/or the spider of the first planetary gear set via the second brake with the housing and/or the sun gear of the third planetary gear set via the third brake with the housing.

From DE 102 13 820 A1 a multiple gear automatic transmission is further known comprising one first input lane T1 of a first reduction ratio; one input lane T2 having a higher reduction ratio than said input lane T1; one planetary gear set with four elements which are one first element, one second element, one third element and one fourth element in the sequence of elements in a rotational speed diagram; one clutch C2 which transmits a rotation from the input lane T2 to the first element S3; one clutch C-1 which transmits a rotation from the input lane T2 to the fourth element S2; one clutch C-4 which transmits a rotation from the input lane T1 to the first element; one clutch C-3 which transmits the rotation from the input lane T1 to the second element C3; one brake B-1 which produces the engagement of the fourth element; one brake B-2 which produces the engagement of the second element; and one output element which is coupled with the third element R3.

Within the scope of the Applicant's DE 101 15 983 A1 a multiple gear transmission is described, having one drive shaft connected with a front-mounted set, one driven shaft connected with a rear-mounted shifting set and with a maximum of seven shifting elements by optional shifting of which at least seven forward gears can be shifted without group shift. The front-mounted set is formed by one front-mounted planetary set or at most two non-shiftable front-mounted planetary gear sets coupled with the first front-mounted planetary gear set wherein the rear-mounted set is designed as two-spider four-shaft transmission with two shiftable rear-mounted planetary gear sets and has four free shafts. The first free shaft of this two-spider four-shaft transmission is connected with the first shifting element, the second free shaft with the second and third shifting elements, the third free shaft with the fourth and fifth shifting elements and the fourth free shaft with the driven shaft. For a multiple gear transmission having a total of six shifting elements, it is inventively proposed to connect the third free shaft or the first free shaft of the rear-mounted set additionally with a sixth shifting element. For a multiple gear transmission having a total of seven shifting elements, it is inventively additionally proposed to connect the third free shaft with a sixth shifting element (D') and the first free shaft with a seventh shifting element.

Within the scope of the Applicant's DE 101 15 987, a multiple gear transmission has also been described having at least seven gears. The transmission comprises, together with the drive shaft and the driven shaft, one non-shiftable front-mounted gear set and one shiftable rear-mounted gear set in the form of a two-spider four-shaft transmission. The front-mounted gear set consists of one first planetary gear set which, together with the input rotational speed of the drive shaft, offers a second rotational speed which can optionally be shifted to a rear-mounted gear set. The rear-mounted gear set is comprised of two shiftable planetary gear sets which, with the six shifting elements, can engage at least seven gears, two power paths being formed. At the same time, group shifts are always advantageously prevented during each shifting operation. One 9-gear multiple gear transmission has also been disclosed in DE 29 36 969; it comprises eight shifting elements and four gear sets.

Automatically shiftable vehicle transmissions in planetary design have often been described already in the prior art and can be object of constant further development and improvement. Thus the transmissions thus must have sufficient number of forward gears, the same as one reverse gear and a ratio very well suited to motor vehicles having a high total spreading and favorable ratio ranges. They must also make a high starting ratio in forward direction and contain a direct gear possible, the same as is adequate for utilization in both passenger cars and in commercial vehicles. Besides, said transmission must have a low construction cost, especially require a small number of shifting elements and during sequential shifting mode prevent double shifts so that during gear shifts in defined gear groups only one shifting element be changed each time.

The problem this invention is to solve is to propose a multiple gear transmission of the type mentioned above in which the construction expenses are optimized and besides the efficiency degree in the main drive gears is improved regarding tow and gearing losses. In addition, low torques must act on the shifting elements and planetary gear sets and the rotational speeds of the shaft, shifting elements and planetary gear sets must be kept as low as possible. Besides, the number of gears and the spreading of the transmission are to be increased so that nine forward gears and one reverse gear can advantageously be implemented. The inventive transmission, in addition, must be adequate for any vehicle design, especially for a front-transverse standard arrangement.

SUMMARY OF THE INVENTION

A multiple gear transmission in planetary design is accordingly proposed which comprises one drive shaft and one driven shaft situated in one housing, three planetary gear sets, at least seven rotatable shafts and at least seven shifting elements including brakes and clutches the selective engagement of which produces different reduction ratios between the drive shaft and the driven shaft so that nine forward gears and one reverse gear can be implemented, wherein the drive shaft is permanently connected with the sun gear of the first planetary gear set and is connectable via one clutch and one fourth shaft with the spider of the third planetary gear set, the driven shaft is permanently connected with the ring gear of the third planetary gear set, one third shaft is permanently connected with the ring gear of the second planetary gear set and the ring gear of the first planetary gear set and is attachable to the housing via one brake, the fourth shaft is permanently connected with the spider of the second planetary gear set and the spider of the third planetary gear set and is attachable to the housing via one brake over the spider of the second planetary gear set. One fifth shaft is also permanently connected with the spider of the first planetary gear set and via one brake is attachable to the housing and one sixth shaft is permanently connected with the sun gear of the second planetary gear set and via one brake is attachable to the housing. According to the invention, one seventh shaft is, on one side, connected with the sun gear of the third planetary gear set and, on the other side, detachably connectable via one clutch with the third shaft and via one other clutch with the fifth shaft.

By virtue of the inventive configuration of the multiple gear transmission adequate ratios result, the same as a considerable increase in the total spreading of the multiple gear transmission, whereby an improvement of the driving comfort and an important reduction in consumption are obtained.

The inventive multiple gear transmission is suitable for any motor vehicle, in particular for passenger cars and for commercial vehicles such as wagons, autobuses, construction vehicles, rail vehicles, chain tractor vehicles and the like.

With the inventive multiple gear transmission, a small number of shifting elements, preferably four brakes and three clutches, further considerably reduces the construction cost. It is advantageously possible with the inventive multiple gear transmission to start with a hydrodynamic torque converter, an external starting clutch or also any adequate external starting element. It is also conceivable to make a starting operation possible with a starting element integrated in the transmission. Preferably adequate is a shifting element actuated in the low gears and in the reverse gear.

With the multiple gear transmission invention, there also results a good degree of efficiency in the main drive gears relative to towing and gearing losses.

Besides, torques in the shifting elements and in the planetary gear sets of the multiple gear transmission are low whereby the wear in the multiple gear transmission is advantageously reduced. The low torques further make a correspondingly small dimensioning possible whereby the needed installation space and attendant costs are reduced. In addition, the rotational speeds in the shafts, the shifting elements and the planetary gear sets are low.

The inventive transmission is, in addition, designed so as to make an adaptability to different drive line structures possible both in power flow direction and with regard to space.

BRIEF DESCRIPTION OF THE DRAWINGS

The invention will now be described, by way of example, with reference to the accompanying drawings in which:

FIG. 3 is a switch system for the inventive multiple gear transmission according to FIG. 1;

FIG. 4 is a switch system for the inventive multiple gear transmission according to FIG. 2;

DETAILED DESCRIPTION OF THE INVENTION

Figure 1:
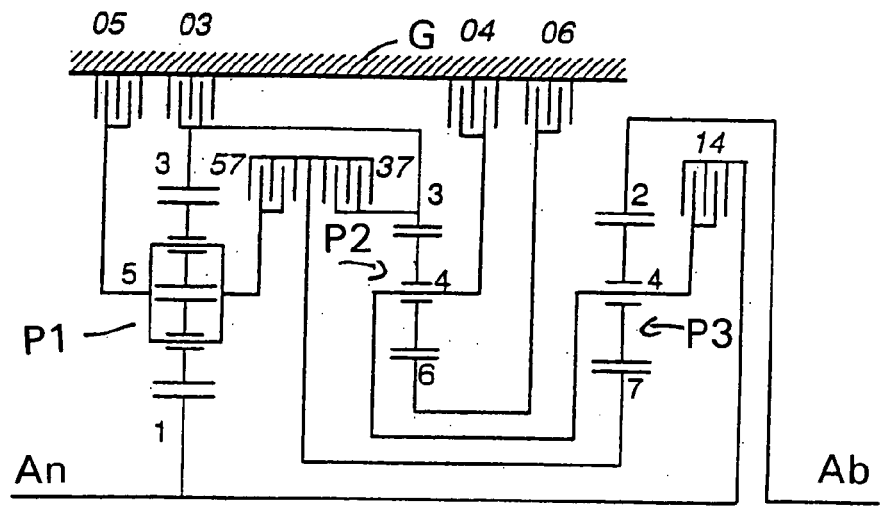
FIG. 1 is a diagrammatic view of a preferred design of an inventive multiple gear transmission.
Figure 2:
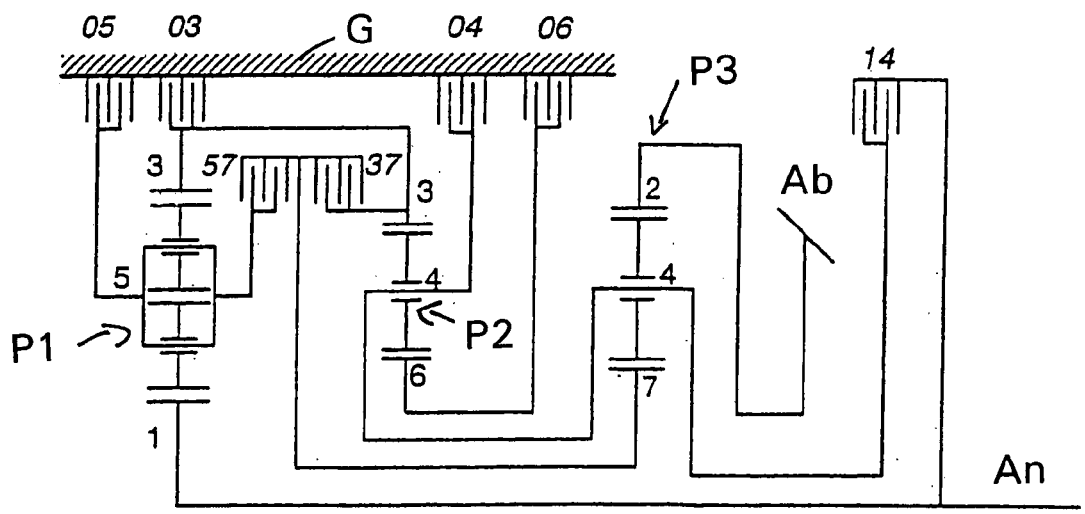
FIG. 2 is a diagrammatic view of one other preferred design of an inventive multiple gear transmission adequate for a front-transverse installation.

In FIGS. 1 and 2, an inventive multiple gear transmission having one drive shaft 1 (An) and one driven shaft 2 (Ab) located in a housing G, is shown. Three planetary gear sets P1, P2, P3 are provided. The first planetary gear set P1 is designed as a plus front-mounted gear set; the second planetary gear set P2 and the third planetary gear set P3 are designed as a minus one-spider planetary gears sets according to the invention.

As can be seen from FIGS. 1 and 2, only seven shifting elements are provided, namely, four brakes 03, 04, 05, 06 and three clutches 14, 37 and 57.

With the shifting elements, a selective shifting of nine forward gears and one reverse gear can be implemented. The inventive multiple gear transmission has a total of seven rotatable shafts, namely, shafts 1, 2, 3, 4, 5, 6, 7.

According to the invention, in the multiple gear transmission is provided that the input results by the shaft 1, which is permanently connected with the sun gear of the first planetary gear set P1 and connectable via the clutch 14 over the shaft 4 with the spider of the third planetary gear set P3. The output results via the shaft 2 which is connected with the ring gear of the third planetary gear set P3. Besides, the shaft 3 is permanently connected with the ring gear of the second planetary gear set P2 and the ring gear of the first planetary gear set P1 and by one brake 03 is attachable to the housing G.

The shaft 4 is permanently connected with the spider of the second planetary gear set P2 and the spider of the third planetary gear set P3 and attachable to the housing G via one brake 04 over the spider of the second planetary gear set P2. In addition, the shaft 5 is permanently connected with the spider of the first planetary gear set P1 and attachable to the housing via one brake 05. On one side, the shaft 7 is connected with the sun gear of the third planetary gear set P3 and, on the other side, detachably connectable via the clutch 37 with the shaft 3 and via the clutch 57 with the shaft 5. The clutches 37 and 57 are preferably disposed side by side and approximately between the first and the second planetary gear sets. They have a common disc carrier within the scope of a preferred embodiment. Radially observed the clutches 57, 37 and 14 are placed preferably approximately above the planetary gear sets.

The other rotatable shaft 6 is, according to the invention, permanently connected with the sun gear of the second planetary gear set P2 and via one brake 06 is attachable to the housing G.

In the inventive multiple gear transmission, no shaft is permanently connected with the housing. The spatial arrangement of the shifting elements can be arbitrary being limited only by the dimensions and the outer molding.

In FIG. 3 is shown a first alternative of a switch system of the inventive multiple gear transmission according to FIGS. 1 and 2. From the switch system can be inferred, by way of example, the respective ratios i of the individual gear steps and the ratio ranges to be determined therefrom. From the switch system can also be inferred that, during sequential shifting mode, double shifts or group shifts are prevented, since two adjacent gear steps, respectively use in common, two shifting elements. As is to be understood from the switch system, it is also possible without group shift to skip gears, for example, 1-3, 1-4, 2-8, 3-5, 3-6, 4-6, 4-8, 4-9, 5-7, 6-8, 6-9. The sixth gear is preferably designed as a direct gear. As is also to be understood from the switch system, 3 shifting elements are always closed, which has a positive effect with regard to towing losses.

The brake 03, the brake 06 and the clutch 47 are closed for the first gear. The second gear is formed by the brake 05, the brake 06 and the clutch 57. The brake 06 and the clutches 37 and 57 are activated for the third gear; the fourth gear needs the brake 06 and the clutches 14 and 57. For the fifth gear, the brake 06 and the clutches 37 and 14 are closed; in the sixth gear, the clutches 14, 37 and 57 are closed. For the seventh gear, the brake 05 and the clutches 14 and 37 are closed and, for the eighth gear, the brake 05 and the clutches 14 and 57. The ninth gear is shifted by closing the brake 03 and the clutches 14 and 57. In the reverse gear R, the brake 04 and the clutches 37 and 57 are activated as shifting elements.

According to the invention, it is also possible to start with an integrated shifting element (IAK). The clutch 57 is especially suitable here, since in the gears 1 and 4 and in the reverse gear, they can all be used the same without reversal of direction of rotation.

In FIG. 4 is shown a second alternative of the switch system of the inventive multiple gear transmission according to FIGS. 1 and 2. The brake 06 is always closed here for the first five gears. Additionally for the first gear, the brake 04 and the clutch 37 are closed; for the second gear, the brake 05 and the clutch 57; for the third gear, the clutches 37 and 57; for the fourth gear, the clutches 14 and 57 and, for the fifth gear, the clutches 14 and 37. For the sixth to the ninth gears, the clutch 14 is always closed. Additionally, for the sixth gear, the clutch 37331 and 57 are closed; for the seventh gear, the brake 05 and the clutch 37; for the eighth gear, the brake 05 and the clutch 57 and, for the ninth gear, the brake 03 and the clutch 57. The brakes 04 and 05 and the clutch 37 are closed for the reverse gear. The same as in the switch system, according to FIG. 3, a great spreading also results here. Besides the ratio ranges in the upper gears are advantageously small.

The brake 05 is especially adequate as an integrated starting element since, in the gears 1 and 2 and in the reverse gear, it is used without reversal of direction of rotation.

According to the invention, in the same transmission diagram pursuant to shifting logic, different ratio ranges result so that a variation specific to utilization and vehicles is made possible.

Figure 11:
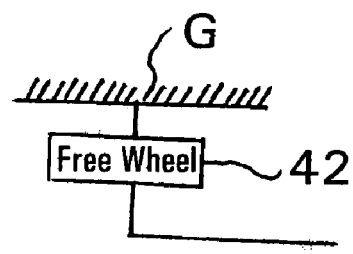
FIG. 11 is a diagrammatic view of an embodiment of the inventive multiple gear transmission having a free wheel.

In addition as shown in FIG. 11, it is possible, according to the invention, to provide added a free wheel(s) 42 on each adequate point of the multiple gear transmission, for example, between one shaft 66 and the housing G or, should that be the case, in order to connect two shafts.

Figure 5:
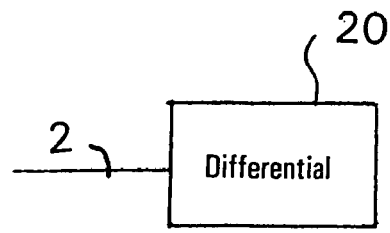
FIG. 5 is a diagrammatic view of an embodiment of the inventive multiple gear transmission having a differential.

It is also possible by the inventive design to locate the input and the output on the same side of the transmission or of the housing, preferably for transverse, front, longitudinal, rear or all-wheel arrangements. An axle differential and/or a transfer differential 20 can also be placed on the input side or, as show in FIG. 5, on the output side.

Figure 6:
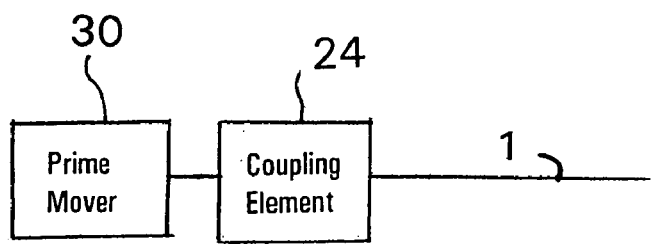
FIG. 6 is a diagrammatic view of an embodiment of the inventive multiple gear transmission with a clutch and a prime mover.
Figure 7:
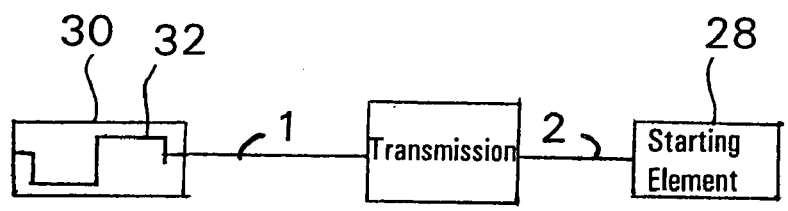
FIG. 7 is a diagrammatic view of an embodiment of the inventive multiple gear transmission having the transmission located between a starting element and a prime mover.
Figure 8:
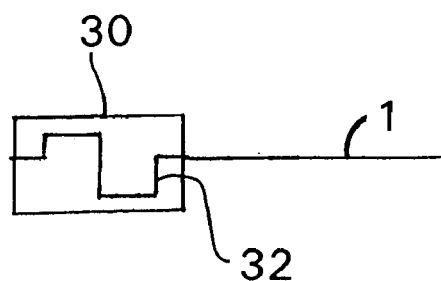
FIG. 8 is a diagrammatic view of an embodiment of the inventive multiple gear transmission for a front-transverse installation with a prime mover.

Within the scope of an advantageous development, as show in FIG. 6, the drive shaft 1 can be separated by a coupling element 24 from an engine or prime mover 26 as needed, a hydrodynamic converter, a hydraulic clutch, a dry starting clutch, a dry starting clutch, a wet starting clutch, a magnetic powder clutch or a centrifugal clutch being used as a coupling element. Also possible is to dispose such a starting element 28, as show in FIG. 7, in a power flow direction behind the transmission, the drive shaft 1 being in this case permanently connected with the crankshaft 32 of the engine or prime mover 30. Additionally, the drive shaft 1 can be permanently connected with the crankshaft 32 of the engine or prime mover 30, as show in FIG. 8.

Figure 9:
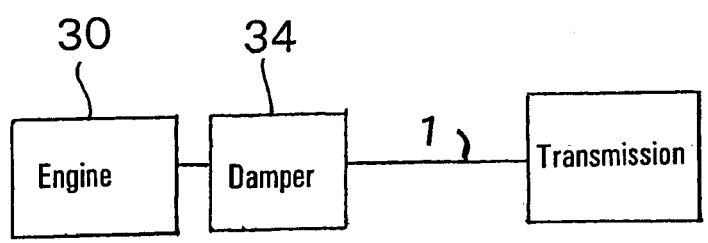
FIG. 9 is a diagrammatic view of an embodiment of the inventive multiple gear transmission having a prime mover and a damper.

The inventive multiple gear transmission additionally makes situating a torsional vibration damper 34 between the engine or prime mover 30 and transmission possible, as shown in FIG. 9.

Figure 10:
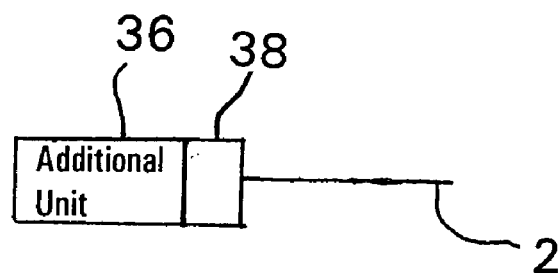
FIG. 10 is a diagrammatic view of an embodiment of the inventive multiple gear transmission with a power take off for an additional unit.
Figure 13:
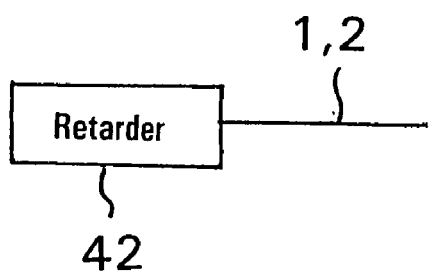
FIG. 13 is a diagrammatic view of a preferred design of the inventive multiple gear transmission having a retarder.

Within the scope of another embodiment of the invention on each shaft, preferably on the drive shaft 1 or the driven shaft 2, it is possible to situate a wear-free brake 42, as shown in FIG. 13, such as a hydraulic or an electric retarder or the like which is particularly important for use in commercial vehicles. To drive an additional unit 36, a power takeoff 38 can be provided on each shaft, preferably the drive shaft 1 or the driven shaft 2, as shown in FIG. 10.

The shifting elements used can be designed as power shiftable clutches or brakes. Especially force-locking clutches or brakes can be used, such as multi-disc clutches, band brakes and/or tapered clutches. Force-locking brakes and/or clutches like synchronizers or dog clutches can also be used.

Figure 12:
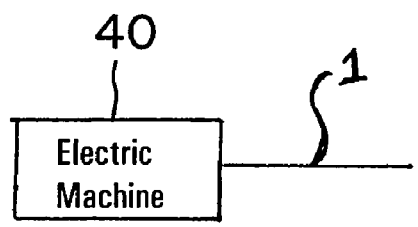
FIG. 12 is a diagrammatic view of an embodiment of the inventive multiple gear transmission with an electric machine.

One other advantage of the multiple gear transmission introduced here consists in that an electric machine 40 can be mounted upon each shaft 66 as a generator and/or as an additional prime mover, as show in FIG. 12.

Every constructional design, especially every spatial arrangement of the planetary gear sets and of the shifting elements per se, the same as with each other and insofar as technically logical, obviously falls under the scope of protection of these claims without affecting the operation of the transmission such as indicated in the claims even if those designs are not explicitly shown in the figures or in the description.

REFERENCE NUMERALS 1 shaft
2 shaft
3 shaft
4 shaft
5 shaft
6 shaft
7 shaft
03 brake
04 brake
05 brake
06 brake
14 clutch
37 clutch
57 clutch
P1 planetary gear set
P2 planetary gear set
P3 planetary gear set
An input
Ab output
i ratio
G housing

The invention claimed is:

1. A multiple gear transmission of planetary design comprising:
    a rotatable drive shaft (1) and a rotatable driven shaft (2) located within a housing (G);
    a first planetary gear set (P1);
    a second planetary gear set (P2);
    a third planetary gear set (P3);
    at least third, fourth, fifth, sixth and seventh rotatable shafts (3, 4, 5, 6, 7);
    at least first, second, third, fourth, fifth, sixth and seventh shifting elements (03, 04, 05, 06, 14, 37, 57) including first, second, third and fourth brakes (03, 04, 05, 06) and first, second and third clutches (14, 37, 57), and selective engagement of the seventh shifting elements (03, 04, 05, 06, 14, 37, 57) produces different reduction ratios between the drive shaft (1) and the driven shaft (2) so that first, second, third, fourth, fifth, sixth, seventh, eighth, and ninth forward gears and one reverse gear are implemented;
    the drive shaft (1) being permanently connected with a sun gear of the first planetary gear set (P1) and being connectable, via the first clutch (14) and the fourth shaft (4), with a spider of the third planetary gear set (P3);
    the driven shaft (2) being permanently connected with a ring gear of the third planetary gear set (P3);
    the third shaft (3) being permanently connected with a ring gear of the first planetary gear set (P1) and a ring gear of the second planetary gear set (P2) and being connectable by the first brake (03) to the housing (G);
    the fourth shaft (4) being permanently connected with a spider of the second planetary gear set (P2) and the spider of the third planetary gear set (P3) and being connectable by the second brake (04) to the housing (G);
    the fifth shaft (5) being permanently connected with a spider of the first planetary gear set (P1) and being connectable by the third brake (05) to the housing (G);
    the sixth shaft (6) being permanently connected with a sun gear of the second planetary gear set (P2) and being connectable by the fourth brake (06) to the housing (G); and
    the seventh shaft (7) being connected, adjacent a first end thereof, with a sun gear of the third planetary gear set (P3) and, adjacent a second end thereof, being detachably connectable, by the second clutch (37), with the third shaft (3) and, by the third clutch (57), with the fifth shaft (5).

2. The multiple gear transmission according to claim 1, wherein the first, the second, the third, the fourth, the fifth, the sixth, the seventh, the eighth, and the ninth forward gears are shiftable such that while shifting from one of the first, the second, the third, the fourth, the fifth, the sixth, the seventh, the eighth, and the ninth forward gears to one of a sequentially higher gear or a sequentially lower gear, only one previously engaged shifting element is disengaged and only one previously unengaged shifting element is engaged.

3. The multiple gear transmission according to claim 1, wherein only three of the first, the second, the third, the fourth, the fifth, the sixth, and the seventh shifting elements are engaged for each of the first, the second, the third, the fourth, the fifth, the sixth, the seventh, the eighth and the ninth forward gears and for the reverse gear.

4. The multiple gear transmission according to claim 1, wherein the second, the fourth and the seventh shifting elements (04, 06, 57) are engaged for the first forward gear; the third, the fourth and the seventh shifting elements (05, 06, 57) are engaged for the second forward gear; the fourth, the sixth and the seventh shifting elements (06, 37, 57) are engaged for the third forward gear; the fourth, the fifth, and the seventh shifting elements (06,14, 57) are engaged for the fourth forward gear; the fourth, the fifth and the sixth shifting elements (06, 14, 37) are engaged for the fifth forward gear; the fifth, the sixth and the seventh shifting elements (14, 37, 57) are engaged for the sixth forward gear; the third, the fifth and the sixth shifting elements (05,14, 37) are engaged for the seventh forward gear; the third, the fifth and the seventh shifting elements (05,14, 57) are engaged for the eighth forward gear; and the first, the fifth, and the seventh shifting elements (03, 14, 57) are engaged for the ninth forward gear.

5. The multiple gear transmission according to claim 1, wherein the second, the fourth, the sixth and the seventh shifting elements (04, 37, 57) are engaged for the reverse gear.

6. The multiple gear transmission according to claim 1, wherein the third, the fourth and the sixth shifting elements (05, 06 37) are engaged for the first forward gear; the third, the fourth and the seventh shifting elements (05, 06, 57) are engaged for the second forward gear; the fourth, the sixth and the seventh shifting elements (06, 37, 57) are engaged the third forward gear; the fourth, the fifth and the seventh shifting elements (06, 14, 57) are engaged for the fourth forward gear; the fourth, the fifth and the sixth shifting elements (06, 14, 37) are engaged for the fifth forward gear; the fifth, the sixth and the seventh shifting elements (14, 37, 57) are engaged for the sixth forward gear; the third, the fifth and the sixth shifting elements (05, 14, 37) are engaged the seventh forward gear; the third, the fifth and the seventh shifting elements (05, 14, 57) are engaged for the eighth forward gear; the first, the fifth and the seventh shifting elements (03, 14, 57) are engaged for the ninth forward gear.

7. The multiple gear transmission according to claim 1, wherein the second, the third and the sixth shifting elements (04, 05, 37) are engaged for the reverse gear.

8. The multiple gear transmission according to claim 1, wherein the second and the third clutches (37, 57) are disposed side by side and approximately between the first and the second planetary gear sets (P1, P2).

9. The multiple gear transmission according to claim 1, wherein the first planetary gear set (P1) is a plus front-mounted gear set and the second planetary gear set (P2) and the third planetary gear set (P3) are minus one-spider planetary gear sets.

10. The multiple gear transmission according to claim 1, wherein a free wheel is inserted in the transmission between one of seven rotatable shafts and the housing (G).

11. The multiple gear transmission according to claim 1, wherein at least one of an axle differential and a transfer differential is located on an output side of the transmission.

12. The multiple gear transmission according to claim 1, wherein the drive shaft (1) is fixedly connected with a crankshaft (32) of a prime mover (30) and a starting clutch (28) is situated in a power flow direction downstream of the transmission.

13. The multiple gear transmission according to claim 1, wherein a torsional vibration damper is located between a prime mover (30) and the transmission.

14. The multiple gear transmission according to claim 1, wherein a retarder is situated upon at least one of the drive shaft (1), the driven shaft (2), the third, the fourth, the fifth, the sixth and the seventh rotatable shafts (3, 4, 5, 6, 7).

15. The multiple gear transmission according to claim 1, wherein a power takeoff (38) is located upon at least one of the drive shaft (1), the driven shaft (2), the third, the fourth, the fifth, the sixth and the seventh rotatable shafts (3, 4, 5, 6, 7) for driving an additional unit (36).

16. The multiple gear transmission according to claim 1, wherein the power takeoff (38) is situated upon at least one of the drive shaft (1) and the driven shaft (2).

17. The multiple gear transmission according to claim 1, wherein the first, the second, the third, the fourth, the fifth, the sixth and the seventh shifting elements (03, 04, 05, 06, 14, 37, 57) are one of brakes and force-locking clutches.

18. The multiple gear transmission according to claim 1, wherein an electric machine (40) is connected to at least one of the drive shaft (1), the driven shaft (2), the third, the fourth, the fifth, the sixth and the seventh rotatable shafts (3, 4, 5, 6, 7) as one of a generator and an additional prime mover.

19. The multiple gear transmission according to claim 1, wherein the first, the second and the third clutches (57, 37,14) are positioned radially further away from a rotational axis of the transmission than the first, the second and the third planetary gear sets (P1, P2, P3).

20. The multiple gear transmission according to claim 1, wherein the second and the third clutches (37, 57) have a common outer disc carrier.

21. The multiple gear transmission according to claim 20, wherein an input to the transmission and an output from the transmission are both located on one side of the housing (G).

22. The multiple gear transmission according to claim 1, wherein a further clutch element separates the drive shaft (1) from a prime mover (30).

23. The multiple gear transmission according to claim 22, wherein the further clutch element is one of a hydrodynamic converter, a hydraulic clutch, a dry starting clutch, a wet starting clutch, a magnetic powder clutch and a centrifugal force clutch.

24. The multiple gear transmission according to claim 1, wherein the drive shaft (1) is permanently connected with a crankshaft (32) of a prime mover (30) and vehicle movement results from engagement of at least one of the first, the second, the third, the fourth, the fifth, the sixth, and the seventh shifting elements (03, 04, 05, 06, 14, 37, 57) of the transmission.

25. The multiple gear transmission according to claim 24, wherein at least one of the third clutch (57) and the third brake (05) is used as one of the first, the second, the third, the fourth, the fifth, the sixth and the seventh shifting elements (03, 04, 05, 06, 14, 37, 57).

26. The multiple gear transmission according to claim 1, wherein the first, the second, the third, the fourth, the fifth, the sixth and the seventh shifting elements (03, 04, 05, 06, 14, 37, 57) are one of a power-shiftable clutches and power-shiftable brakes.

27. The multiple gear transmission according to claim 26, wherein the first, the second, the third, the fourth, the fifth, the sixth and the seventh shifting elements (03, 04, 05, 06, 14, 37, 57) are one of multi-disc clutches, band brakes and tapered clutches.

* * * * *